(12) United States Patent
Kandekar et al.

(10) Patent No.: US 9,326,116 B2
(45) Date of Patent: Apr. 26, 2016

(54) SYSTEMS AND METHODS FOR SUGGESTING A PAUSE POSITION WITHIN ELECTRONIC TEXT

(75) Inventors: Kunal Kandekar, Jersey City, NJ (US); Scott Curtis, Durham, NC (US)

(73) Assignee: Rhonda Enterprises, LLC, Wilmington, DE (US)

( * ) Notice: Subject to any disclaimer, the term of this patent is extended or adjusted under 35 U.S.C. 154(b) by 646 days.

(21) Appl. No.: 13/117,540

(22) Filed: May 27, 2011

(65) Prior Publication Data
US 2012/0206472 A1    Aug. 16, 2012

Related U.S. Application Data

(60) Provisional application No. 61/376,321, filed on Aug. 24, 2010.

(51) Int. Cl.
*G06F 17/21* (2006.01)
*H04W 4/20* (2009.01)
*G06Q 30/02* (2012.01)
*H04W 4/02* (2009.01)

(52) U.S. Cl.
CPC .............. *H04W 4/206* (2013.01); *G06F 17/211* (2013.01); *G06Q 30/0214* (2013.01); *H04W 4/023* (2013.01)

(58) Field of Classification Search
CPC ............ G06F 17/30884; G06F 17/211; G06F 17/30864
USPC ................ 715/782; 704/9, E15.003; 345/581
See application file for complete search history.

(56) References Cited

U.S. PATENT DOCUMENTS

| 4,958,284 | A | 9/1990 | Bishop et al. |
| 5,146,552 | A | 9/1992 | Cassorla et al. |
| 5,297,039 | A | 3/1994 | Kanaegami et al. |

(Continued)

FOREIGN PATENT DOCUMENTS

| KR | 1020070077174 A | 7/2007 |
| KR | 1020100099925 A | 9/2010 |
| WO | WO 2010143500 A1 * | 12/2010 |

OTHER PUBLICATIONS

Chang, B.-W. And Ungar, D., "Animation: From Cartoons to the User Interface," The SML Technical Report Series, Mar. 1995, copyright 1995, Sun Microsystems, Inc., SMLI-TR-95-33, found at <http://labs.oracle.com/techrep/1995/smli_tr-95-33.pdf>, originally published in UIST '93: User Interface Software and Technology, Nov. 1993, 18 pages.

(Continued)

*Primary Examiner* — Scott Baderman
*Assistant Examiner* — Seung Jung

(57) ABSTRACT

Systems and methods for suggesting a pause position within electronic text are disclosed herein. According to an aspect, a method may include receiving identification of a current user position within electronic text residing on an electronic device. For example, a current user position may be a page of an e-book that is currently being displayed to a reader or user. The method may include determining a suggested pause position within the electronic text based on the current user position. For example, the suggested pause position may be determined based on the reader's profile, a reading behavior of other readers, metadata, or combinations thereof. The method may also include presenting the suggested pause position on a user interface of the electronic device.

33 Claims, 10 Drawing Sheets

(56) References Cited

U.S. PATENT DOCUMENTS

| | | | |
|---|---|---|---|
| 5,640,552 A | 6/1997 | Yianilos | |
| 5,642,520 A | 6/1997 | Takeshita et al. | |
| 5,708,825 A | 1/1998 | Sotomayor | |
| 5,731,805 A | 3/1998 | Tognazzini et al. | |
| 5,737,599 A | 4/1998 | Rowe et al. | |
| 5,802,516 A | 9/1998 | Shwarts et al. | |
| 6,052,657 A | 4/2000 | Yamron et al. | |
| 6,070,133 A | 5/2000 | Brewster et al. | |
| 6,243,071 B1* | 6/2001 | Shwarts et al. | 715/823 |
| 6,353,824 B1 | 3/2002 | Boguraev et al. | |
| 6,529,948 B1 | 3/2003 | Bowman-Amuah | |
| 6,553,310 B1 | 4/2003 | Lopke | |
| 6,638,317 B2 | 10/2003 | Nakao | |
| 6,862,710 B1 | 3/2005 | Marchisio | |
| 6,992,687 B1 | 1/2006 | Baird et al. | |
| 7,103,848 B2 | 9/2006 | Barsness et al. | |
| 7,113,897 B2 | 9/2006 | Shimizu et al. | |
| 7,143,348 B1 | 11/2006 | Krause | |
| 7,158,971 B1 | 1/2007 | Bascom | |
| 7,158,983 B2 | 1/2007 | Willse et al. | |
| 7,185,001 B1 | 2/2007 | Burdick et al. | |
| 7,236,966 B1 | 6/2007 | Jackson et al. | |
| 7,239,747 B2 | 7/2007 | Bresler et al. | |
| 7,340,466 B2 | 3/2008 | Odom et al. | |
| 7,366,715 B2 | 4/2008 | Liu et al. | |
| 7,398,196 B1 | 7/2008 | Liu et al. | |
| 7,398,200 B2 | 7/2008 | Ie et al. | |
| 7,430,504 B2 | 9/2008 | Vanderwende et al. | |
| 7,437,023 B2 | 10/2008 | King et al. | |
| 7,523,103 B2 | 4/2009 | Goel et al. | |
| 7,594,187 B2 | 9/2009 | Baird et al. | |
| 7,693,912 B2 | 4/2010 | Rose et al. | |
| 7,716,077 B1 | 5/2010 | Mikurak | |
| 7,716,224 B2 | 5/2010 | Reztlaff, II et al. | |
| 7,774,198 B2 | 8/2010 | Roulland et al. | |
| 7,793,230 B2 | 9/2010 | Burns et al. | |
| 7,809,717 B1 | 10/2010 | Hoeber et al. | |
| 7,849,081 B1 | 12/2010 | Chang et al. | |
| 7,958,138 B2* | 6/2011 | Krause | 707/765 |
| 2001/0044758 A1 | 11/2001 | Talib et al. | |
| 2003/0014674 A1* | 1/2003 | Huffman et al. | 713/300 |
| 2003/0193523 A1 | 10/2003 | Johnson | |
| 2005/0108001 A1 | 5/2005 | Aarskog | |
| 2005/0198070 A1 | 9/2005 | Lowry | |
| 2005/0203918 A1 | 9/2005 | Holbrook | |
| 2005/0246391 A1 | 11/2005 | Gross | |
| 2006/0004704 A1 | 1/2006 | Gross | |
| 2006/0125846 A1 | 6/2006 | Springer et al. | |
| 2006/0156222 A1 | 7/2006 | Chi et al. | |
| 2006/0173985 A1 | 8/2006 | Moore | |
| 2006/0194181 A1 | 8/2006 | Rosenberg | |
| 2007/0025189 A1 | 2/2007 | Wang | |
| 2007/0061128 A1 | 3/2007 | Odom et al. | |
| 2007/0067317 A1 | 3/2007 | Stevenson | |
| 2007/0073745 A1 | 3/2007 | Scott et al. | |
| 2007/0074102 A1 | 3/2007 | Kraft et al. | |
| 2007/0150456 A1 | 6/2007 | Lian et al. | |
| 2007/0168413 A1 | 7/2007 | Barletta et al. | |
| 2007/0219968 A1 | 9/2007 | Frank | |
| 2007/0296556 A1 | 12/2007 | Wang | |
| 2008/0010262 A1 | 1/2008 | Frank | |
| 2008/0010273 A1 | 1/2008 | Frank | |
| 2008/0010605 A1 | 1/2008 | Frank | |
| 2008/0040313 A1 | 2/2008 | Schachter | |
| 2008/0079692 A1 | 4/2008 | Liang et al. | |
| 2008/0141117 A1 | 6/2008 | King et al. | |
| 2008/0231644 A1 | 9/2008 | Lempel et al. | |
| 2008/0243788 A1 | 10/2008 | Reztlaff et al. | |
| 2008/0243805 A1 | 10/2008 | Gutta et al. | |
| 2009/0077658 A1 | 3/2009 | King et al. | |
| 2009/0083027 A1* | 3/2009 | Hollingsworth | 704/9 |
| 2009/0083613 A1 | 3/2009 | Davis | |
| 2009/0106688 A1* | 4/2009 | Keohane et al. | 715/786 |
| 2009/0248683 A1 | 10/2009 | Krause | |
| 2009/0254572 A1 | 10/2009 | Redlich et al. | |
| 2010/0076274 A1 | 3/2010 | Severson | |
| 2010/0092095 A1 | 4/2010 | King et al. | |
| 2010/0094878 A1 | 4/2010 | Soroca et al. | |
| 2010/0174980 A1 | 7/2010 | Mansfield et al. | |
| 2010/0195975 A1 | 8/2010 | Issa et al. | |
| 2010/0250341 A1* | 9/2010 | Hauser | 705/10 |
| 2011/0066965 A1 | 3/2011 | Choi | |
| 2011/0087955 A1* | 4/2011 | Ho et al. | 715/230 |
| 2011/0238408 A1 | 9/2011 | Larcheveque et al. | |
| 2011/0261030 A1 | 10/2011 | Bullock | |
| 2012/0078612 A1 | 3/2012 | Kandekar et al. | |
| 2012/0078613 A1 | 3/2012 | Kandekar et al. | |
| 2012/0079372 A1 | 3/2012 | Kandekar et al. | |
| 2012/0210203 A1 | 8/2012 | Kandekar et al. | |

OTHER PUBLICATIONS

Graesser, A. et al., "Latent Semantic Analysis Captures Causal, Goal-oriented, and Taxonomic Structures," Proc. Int. Conf. CogSci '00, Philadelphia, Pennsylvania, Aug. 13-15, 2000, found at <http://citeseerx.ist.psu.edu/viewdoc/download?doi=10.1.1.23.5444&rep=rep1&type=pdf>, 6 pages.

Hearst, Marti A., "TextTiling: Segmenting Text into Multi-paragraph Subtopic Passages," Computational Linguistics, vol. 23, No. 1, pp. 33-64, Mar. 1997, copyright 1997, Association for Computational Linguistics, 32 pages.

Hon, Dan, "The future is Movie OS," posted Apr. 16, 2010, Extenuating Circumstances weblog, found at <http://danhon.com/2010/04/16/the-future-is-movie-os/>, printed Oct. 26, 2011, 21 pages.

"Illinois Named Entity Tagger," found at <http://cogcomp.cs.illinois.edu/p./software_view/4> on Internet Archive, dated Sep. 7, 2010, copyright 2010, University of Illinois at Urbana-Champaign, printed Oct. 26, 2011, 1 page.

Lopes, Rui, "Time-Based Hypermedia Processing and Pattern System," Departamento de Informatica, Faculdade de Ciencias da Universidade de Lisboa, Portugal, Jun. 2006, 133 pages.

"Named entity recognition," Wikipedia, found at <http://en.wikipedia.org/wiki/Named_Entity_Recognition> on Internet Archive, dated Oct. 19, 2010, page last modified Sep. 23, 2010, printed Oct. 26, 2011, 3 pages.

Pasca, Marius, "Organizing and Searching the World Wide Web of Facts—Step Two: Harnessing the Wisdom of the Crowds," WWW 2007, May 8-12, 2007, Banff, Alberta, Canada, 10 pages.

Ratinov, L. And Roth, D., "Design Challenges and Misconceptions in Named Entity Recognition," Proceedings of the Thirteenth Conference on Computational Natural Language Learning (CoNLL), Boulder, Colorado, Jun. 2009, pp. 147-155, copyright 2009, Association for Computational Linguistics, found at <http://cogcomp.cs.illinois.edu/papers/RatinovRo09.pdf>, 9 pages.

"RunPee.com," found at <http://runpee.com/> on the Internet Archive, dated Nov. 2, 2009, printed Nov. 11, 2011, 1 page.

Thangamani, M. et al., "Integrated Clustering and Feature Selection Scheme for Text Documents," Journal of Computer Science, vol. 6, No. 5, pp. 536-541, copyright 2010, Science Publications, 6 pages.

"Wireless, Whispernet and Whispersync," found at <http://www.amazon.com/gp/help/customer/display.html?nodeId=200375890&#syncing> on Internet Archive, dated Oct. 10, 2009, printed Oct. 26, 2011, 10 pages.

International Search Report and Written Opinion for PCT/US2011/053660, dated Apr. 27, 2012, International Searching Authority, Korean International Property Office, 14 pages.

Butarbutar, M. and McRoy, S., "Indexing Text Documents Based on Topic Identification," Lecture Notes in Computer Science (LNCS), SPIRE 2004, LNCS 3246, Apostolico, A. And Melucci, M. (Eds.), copyright 2004, Springer-Verlag Berlin Heidelberg, pp. 113-124, 12 pages.

Tur, Gokhan et al., "Integrating Prosodic and Lexical Cues for Automatic Topic Segmentation," Computational Linguistics, vol. 27, No. 1, Mar. 2001, pp. 31-57, 27 pages.

Gelfand, B. et al., "Discovering Concepts in Raw Text: Building Semantic Relationship Graphs," in ICML/AAAI workshop on Learning for Text Categorization, Jul. 26-27, 1998, Madison, Wisconsin, 10 pages.

* cited by examiner

SYSTEMS AND METHODS FOR SUGGESTING A PAUSE POSITION WITHIN ELECTRONIC TEXT

CROSS REFERENCE TO RELATED APPLICATION

This application claims the benefit of U.S. provisional patent application No. 61/376,321, filed Aug. 24, 2010, the content of which is hereby incorporated herein by reference in its entirety.

TECHNICAL FIELD

The present disclosure relates to systems and methods for presenting electronic text and associated information to electronic device users.

BACKGROUND

Electronic books, or e-books, are text and image-based publications in digital form produced on, published by, and readable on computers or other electronic devices. E-books are often read on dedicated hardware devices, such as e-book readers or e-book devices. Personal computers, mobile devices, such as smart phones and tablet computers, and other suitable devices may also be used for reading e-books.

Readers often do not finish reading an e-book, or other electronic text of significant length, in a single sitting or reading session. Readers often need multiple reading sessions to finish reading an e-book. In some cases, busy readers may have only a limited time that they can dedicate to reading an e-book in one reading session. Such readers may end up reading longer than planned, as they may lose track of time or, for example, a plot development keeps them interested in continuing to read the e-book beyond an allotted time period. Accordingly, it is desirable to provide techniques for improving readers' ability to manage their time when reading electronic text.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for suggesting a pause position within electronic text. According to an aspect, a method may include receiving identification of a current user position within electronic text residing on an electronic device. For example, a current user position may be a page of an e-book that is currently being displayed to a reader or user. The method may include determining a suggested pause position within the electronic text based on the current user position and/or other information. For example, the suggested pause position may be determined based on the reader's profile, a reading behavior of other readers, metadata, or combinations thereof. A reader profile may include, for example, but is not limited to, an available read time for the reader, a calendar of the reader, a reading behavior of the reader, a current time, a reading speed of the reader, a location of the reader, an activity of the reader, the like, and combinations thereof. The method may also include presenting the suggested pause position on a user interface of the electronic device. For example, an e-book may display a graphic corresponding to a suggested pause position for indicating the suggested pause position. In another example, a speaker of an e-book may be controlled to emit a sound in response to determining that the current position of the e-book is the suggested pause position.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
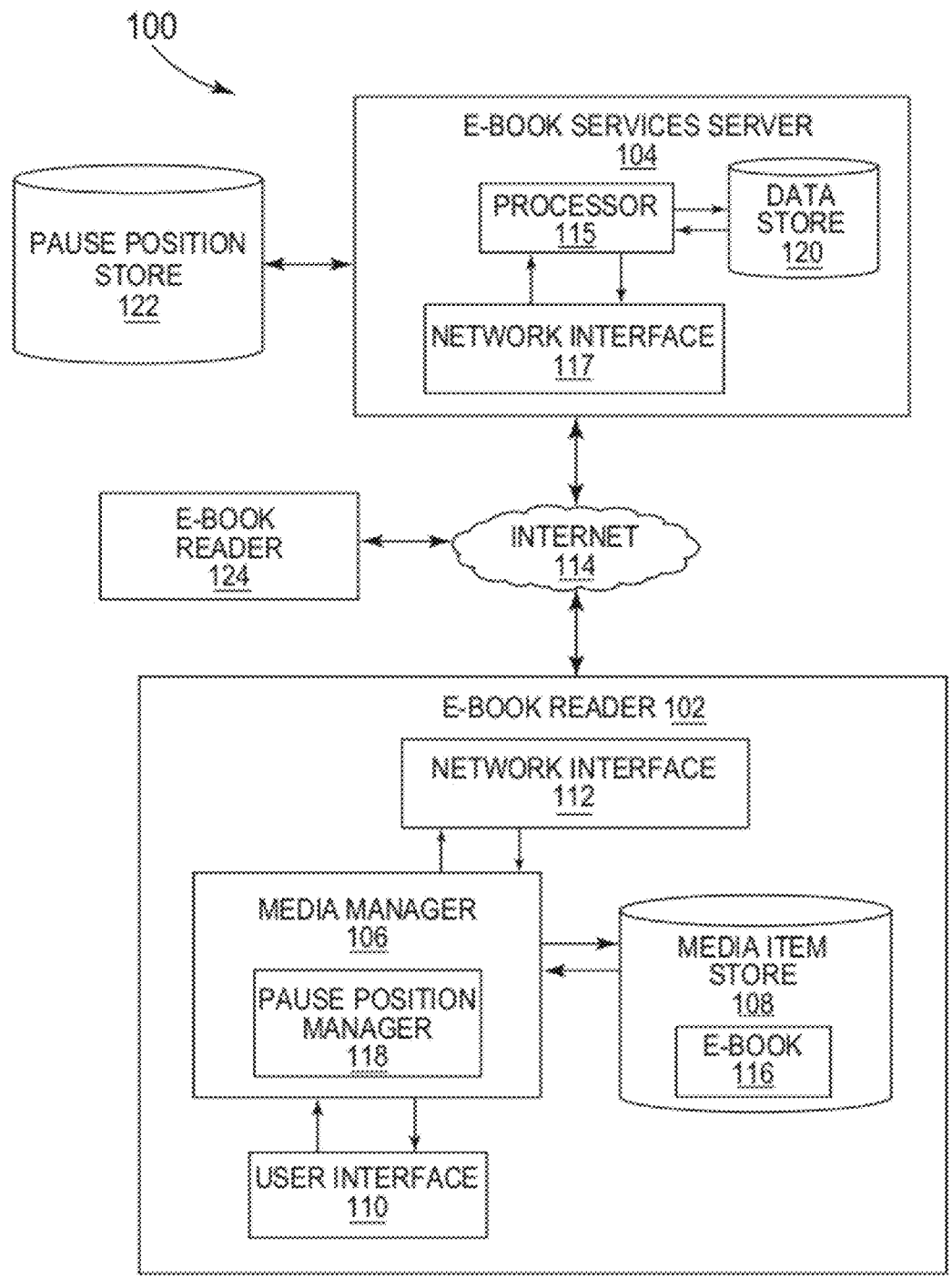
FIG. 1 is a schematic diagram of a system for suggesting a pause position within electronic text according to embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable an electronic device, such as an e-book reader, to receive identification of a current user position within electronic text residing on an electronic device, to determine a suggested pause position within the electronic text based on the current user position, and to present the suggested pause position to the user of the electronic text. For example, an e-book reader may identify a page of an e-book that is currently being displayed to a user. Further, the e-book reader may determine a suggested pause position within the electronic text of the e-book based on the current user position. The e-book reader may then, for example, display or otherwise present the suggested pause position to the user by use of a user interface. As a result, the reader can plan to stop reading at the suggested pause position when he or she reaches it during a reading session. The suggested pause position may be a position in the electronic text where the reader can stop and, for example, avoid crossing a major plot development or start of a new topic.

As referred to herein, the term "electronic device" should be broadly construed. It can include any type of device capable of presenting electronic text to a user. For example, the electronic device may be an e-book reader configured to present an e-book to a user. Example e-book readers include, but are not limited to, the KINDLE® and NOOK® e-book readers. In another example, an electronic device may be a mobile device such as, for example, but not limited to, a smart phone, a cell phone, a pager, a personal digital assistant (PDA, e.g., with GPRS NIC), a mobile computer with a smart phone client, or the like. An electronic device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of mobile wireless devices. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on an e-book reader, the examples may similarly be implemented on any suitable electronic device, such as a computer or smart phone.

As referred to herein, the term "electronic text" should be broadly construed. Example electronic text can be presented and stored in the form of book pages that may be browsed using an electronic device such as, for example, an e-book reader or tablet computer. The electronic text may be stored in any suitable format, such as, but not limited to, portable document format (PDF), hypertext markup language (HTML), extensible markup language (XML), EPUB, or any suitable e-book or word processing format.

As referred to herein, a "user interface" is generally a system by which users interact with an electronic device. An interface can include an input for allowing users to manipulate an electronic device, and can include an output for allowing the system to present information (e.g., electronic text) and/or data, indicate the effects of the user's manipulation, etc. An example of an interface on an electronic device includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of an electronic device and can be selected by, and interacted with by, a user using the interface. In an example, the display of the electronic device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well-known. In a representative embodiment, a mobile electronic device, such as an e-book reader, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, embodiments in accordance with the present disclosure may be implemented in other and next-generation mobile networks and devices as well. The mobile device is the physical equipment used by the end user, typically a subscriber to the wireless network. Typically, a mobile device is a 2.5G-compliant device, 3G-compliant device, or 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The electronic device may also include a memory or data store.

The presently disclosed subject matter is now described in more detail. For example, FIG. 1 illustrates a schematic diagram of a system 100 for suggesting a pause position within electronic text according to embodiments of the present disclosure. Referring to FIG. 1, the system 100 includes an e-book reader 102 and an e-book services server 104. The e-book reader 102 may be any type of electronic device capable of presenting electronic text to a user. Further, the e-book reader 102 may include a number of functional components. This representation of the e-book reader 102 is meant to be for convenience of illustration and description, and it should not be taken to limit the scope of the present disclosure as one or more functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The e-book reader 102 may include a media manager 106 for managing storage of electronic text (e.g., one or more e-books) in a media item store 108 and for controlling presentation of electronic text to a user. The e-book reader 102 may include a user interface 110 capable of receiving user input and of presenting content to a user. For example, the user interface 110 may include a display capable of presenting electronic text of an e-book to a user and a touch screen for accepting user input. The media item store 108 may be a suitable memory device.

The e-book reader 102 may also be configured to communicate with other devices. For example, the e-book reader 102 may include a network interface 112 configured to communicate with the server 104 via the Internet 114 or any other suitable network, such as a wireless network or local area network (LAN). In another example, the e-book reader 102 can be Internet-accessible and can interact with the server 104 using Internet protocols such as HTTP, HTTPS, and the like. The server 104 is shown as a single device but this is not a requirement, whereas one or more programs, processes, or other code may comprise the server and be executed on one or more machines in one or more networked locations. Further, the server 104 may include a processor 115 and a network interface 117 for implementing functionality as described herein and for communicating with the Internet 114. The e-book reader 102 may also be configured to communicate with other electronic devices via the Internet 114 or another suitable network.

The operation of the system can be described by the following example. As shown in FIG. 1, the e-book reader 102 includes various functional components and associated data stores to facilitate the operation. The operation of the disclosed methods may be implemented using system components other than as shown in FIG. 1.

A user of the e-book reader 102 may use an application (often referred to as an "app") residing on the e-book reader 102 to interact with an e-book 116 stored in the media item store 108. The application may reside on the e-book reader 102 and be a part of the media manager 106. The user may, for example, input commands into the user interface 110 for opening the e-book 116 and for interacting with the e-book 116. The application may present text and/or images of the e-book 116 to the user via a display of the user interface 110. The user may suitably interact with the e-book reader 102 to control the display of different portions of the e-book's content. For example, the user may touch the display, such as by use of a "swiping" motion on the surface of the display, to command the media manager 106 to "turn" pages of the e-book as will be understood. The user may turn or otherwise select pages for display by any other suitable technique as will be understood.

In another example, the user may interact with a display of the e-book reader 102 for selecting one or more portions of the e-book for display. The user may select a portion of the e-book by touching or swiping a desired portion of the e-book displayed to the user. For example, the user may touch or swipe a word, one or more paragraphs, or any location on a displayed page for selecting that portion or adjacent portions for display. The displayed portion of the e-book may be identified as a current user position within the e-book. The media manager 106 may receive identification of the current user position and, in response, determine a suggested pause position within the e-book based on the current user position. Further, the media manager 106 may control the user interface 110 to present the suggested pause position to the user of the e-book reader 102.

Figure 2:
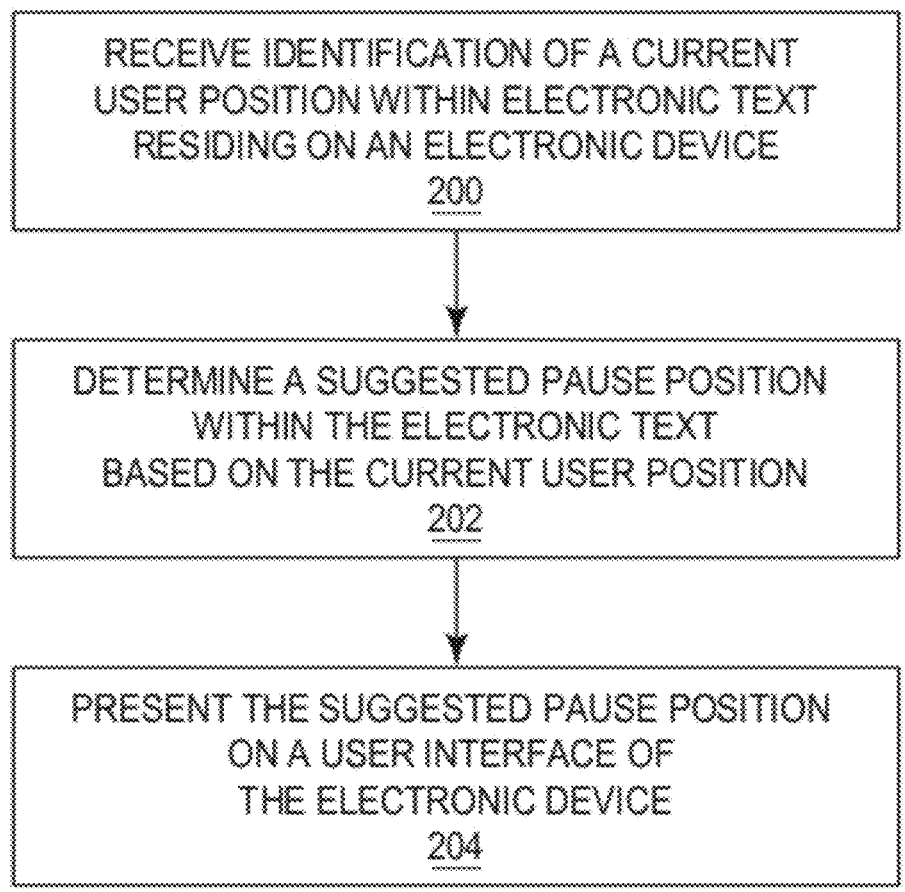
FIG. 2 is a flow chart of an exemplary method for suggesting a pause position within electronic text according to embodiments of the present disclosure.

In accordance with embodiments of the present disclosure, FIG. 2 illustrates a flow chart of an exemplary method for suggesting a pause position within electronic text. The method of FIG. 2 is described with respect to the example system 100 shown in FIG. 1, although the method may be implemented by any suitable system or electronic device. The steps of FIG. 2 may be implemented entirely, or in part, by a pause position manager 118 residing on the e-book reader 102 shown in FIG. 1. The pause position manager 118 may be implemented by software, hardware, firmware, or combinations thereof.

Referring to FIG. 2, the method includes receiving identification of a current user position within electronic text residing on an electronic device (step 200). For example, the pause position manager 118 of the e-book reader 102 may determine a page, paragraph, or other portion of the e-book 116 that is currently being presented to a reader via the user interface 110 (e.g., a display of the user interface 110). The user position within the e-book 116 may correspond to the portion of the e-book 116 that is currently being presented to the reader, or that has recently been presented to the reader. A current user position within electronic text may be identified by, for example, but not limited to, a page number, a paragraph number, a word number, a chapter number, the like, and combinations thereof.

The method of FIG. 2 includes determining a suggested pause position within the electronic text based on the current user position (step 202). For example, the pause position manager 118 may determine a suggested pause position within the e-book 116 based on a page currently being displayed to a reader via the user interface 110. In accordance with embodiments of the present disclosure, the e-book 116 may include metadata identifying the suggested pause position. The pause position manager 118 may use a page number, for example, to extract the suggested pause position from the metadata of the e-book 116. The suggested pause position in the metadata may be indexed or otherwise organized based on a position within the e-book 116. For example, the pause position manager 118 may use the current user position to look up the suggested pause position within the metadata.

In an example, the metadata may store more than one suggested pause position based on a current user position. In this case, the reader may be presented with multiple suggested pause positions based on his or her current position within electronic text. The reader may then decide where to stop reading based on the suggested pause positions. In an example, if the reader has an extended period of time available to read the electronic text, the reader may decide to stop reading at a suggested pause position that is furthest from his or her current position than other suggested pause positions. In contrast, if the reader has only allotted a few minutes for reading in this session, the reader may decide to stop reading at a suggested pause position that is nearest to his or her current position within the electronic text. In this way, the reader may select from multiple pause positions based on his or her time available for reading during the current reading session.

In another example of determining a suggested pause position, the suggested pause position may be received from a server via a communications network. For example, the pause position manager 118 may request a suggested pause position from the server 104 via the Internet 114. The request may specify the e-book 116, or a current user position within the e-book 116. In response to the request, the server 104 may communicate a response to the e-book reader 102 that indicates one or more suggested pause positions within the e-book reader 102. For example, the response may indicate one or more suggested pause positions for various positions within a specified e-book. In another example, the response may indicate one or more suggested pause positions for a specified user position within an e-book. In response to receipt of the suggested pause position(s), the e-book 116 may present the suggested pause position(s) to a reader.

In another example of determining a suggest pause position, one or more suggested pause positions may be determined based on reading behavior of multiple other users. For example, the reading behavior may be the reading behavior of other readers that have read or are currently reading an electronic text such as the e-book 116 shown in FIG. 1. For example, metadata of the e-book 116 or the server 104 may store information indicating actual pause positions in the e-book 116 where others have paused when reading the e-book 116. These pause positions may indicate good positions at which other readers may pause when reading the same e-book. The pause position manager 118 may determine one or more suggested pause positions based on actual pause positions of other users. For example, the pause position manager 118 may designate as suggested pause positions, the actual pause positions that follow after the current user position within the e-book 116. More specifically, for example, if actual pause positions are pages 26, 53, and 98, and the current user position is page 35, the suggested pause positions may be 53 and/or 98.

In another example of determining a suggested pause position, one or more suggested pause positions may be determined based on a user profile. For example, the pause position manager 118 may determine one or more suggested pause positions based on a user profile of a reader of the e-book 116. In an example, the e-book reader 102 may store a user profile of the reader. A user profile may include, but is not limited to, an available read time for the user, a calendar of the user, a reading behavior of the user, a current time, a reading speed of the user, an activity of the user, the like, and combinations thereof. The suggested pause position may be determined based on the current user position and the user profile.

In an example of an available read time for a user, the user may specify a time that the user has available to read electronic text. For example, the user may use the user interface 110 for specifying his or her available time for reading the e-book 116. Alternatively, the pause position manager 118 may automatically determine the available read time based on one or more criteria such as, for example, but not limited to, a user's historic reading behavior. For example, the user's routine may be to read for about an hour before bedtime (e.g., between about 10:30 pm and 11:30 pm each night). The pause position manager 118 may record a length of time that a user spends reading electronic text on the e-book reader 102 and a time of day when the reader reads the electronic text. In this case, the pause position manager 118 may recognize patterns in the user's reading behavior. For example, the pause position manager 118 may average the reading times at particular times of day to determine an average read time for the user. The pause position manager 118 may also determine how much content the reader reads during the times. When the reader begins reading at the time of day, the pause position manager 118 may determine a suggested pause position based on the user's reading behavior. For example, the pause position manager 118 may determine a suggested pause position based on the time of day when the reader is reading electronic text and the average read time for the reader. The pause position manager 118 can predict where in the electronic text that the reader can reach during the average read time. The suggested pause position may be a stored suggested pause position for the electronic text that is near the position where the reader is predicted to reach.

In an example of a calendar of a user, the pause position manager 118 may determine an amount of time that the user has available to read electronic text based on entries in the user's calendar. For example, the user's calendar may be stored on the e-book 116 and may include one or more entries for meetings. In response to a reader opening the e-book 116, the pause position manager 118 may determine that the reader has a time period from a current time up until a start time of the next scheduled meeting to read the e-book 116. Next, the pause position manager 118 can predict the amount of content of the e-book 116 that the reader can read before the start of the next meeting. The pause position manager 118 may then determine a suggested pause position based on a current position of the reader in the e-book 116 and the predicted amount of content that can be read. The pause position manager 118 may select a pause position that is near a position where the reader can reach.

In an example of an activity of a user, the pause position manager 118 may determine an activity of a user based on input into an electronic device. For example, a global positioning system (GPS) device on an electronic device may detect that the device is moving. In this case, the pause position manager 118 may infer that the user is traveling and may have only a limited time to read an opened e-book. In this example, the pause position manager 118 may select a suggested pause position among multiple suggested pause positions that is near to the current user position. The suggested pause position can be a position where the reader can be expected to reach within the time available to read.

In accordance with embodiments of the present disclosure, a suggested pause position may be determined based on a content of electronic text. For example, the pause position manager 118 may apply semantic analysis to the content of electronic text for determining one or more suggested pause positions. Particularly, for example, the pause position manager 118 may apply semantic analysis to the content of the e-book 116 that follows a current user position for determining one or more suggested pause positions.

In an example of applying semantic analysis for determining suggested pause positions, the pause position manager 118 may determine a portion of electronic text content that relates to a plot point and/or subject change. For example, the plot point may be at a portion of the e-book 116 where the theme of a story changes. In an example, the subject change may be at a portion of the e-book 116 where the subject described in the e-book 116 changes to another subject, such as in non-fiction works. Any suitable semantic analysis technique may be used for determining the portion of text associated with an important plot point or subject change. Next, the pause position manager 118 may assign a position of the plot point or subject change as a suggested pause position.

In another example of applying semantic analysis for determining suggested pause positions, the pause position manager 118 may determine a similarity score between text subgroups within electronic text. For example, different portions of the e-book 116 may include words and/or phrases that are similar. The similarity score may be determined based on, for example, but not limited to, a number of words and/or phrases that are similar or the same in the different portions. Note that similarity may be determined based on relations of terms in an ontology rather than simply text matching. Next, the pause position manager 118 may determine whether the similarity score is less than a predetermined threshold. In response to determining that the similarity score is less than the predetermined threshold, a position between the text subgroups may be assigned as the suggested pause position. For example, if the number of similar or same words and phrases is less than a predetermined number, the position between the portions of text may be assigned as the suggested pause position. In another embodiment, other methods, such as latent semantic analysis, may also be used to determine the similarity or semantic relatedness of portions of text. In this case, it may be assumed that if the portions of text are dissimilar, then that position in the text may be a good position for pause by the reader.

Figure 3:
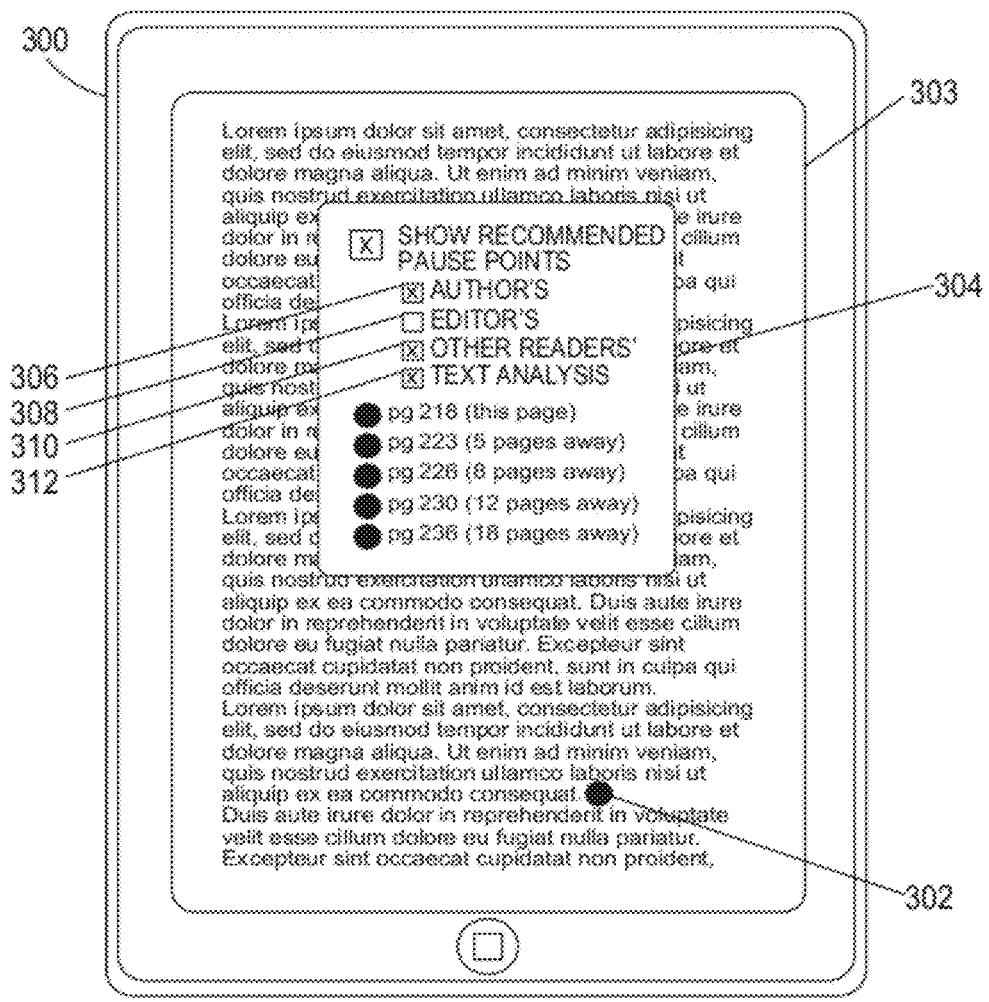
FIG. 3 is a front view of an exemplary e-reader displaying content of an e-book along with a graphic indicating a suggested pause position in accordance with embodiments of the present disclosure.

The method of FIG. 2 includes presenting the suggested pause position to the user of the electronic device (step 204). For example, the pause position manager 118 may control a display of the user interface 110 to display a graphic corresponding to one or more suggested pause positions for indicating the suggested pause position(s). FIG. 3 illustrates a front view of an exemplary e-reader 300 displaying content of an e-book along with a graphic 302 indicating a suggested pause position in accordance with embodiments of the present disclosure.

Referring to FIG. 3, the tablet computer 300 displays a page 303 of an e-book. The e-book 300 also displays the graphic 302 within the text of the page 303 for indicating a suggested pause position within the e-book. In this example, the graphic 302 is a "dot" positioned within the text of the page 303. A graphic for indicating a pause position may be any suitable image of any suitable shape or size for indicating a position within an e-book. The graphic may be, for example, displayed in any suitable location within the text of an e-book 300 for indicating that its position is the suggested pause position.

In another example, the pause position manager may control the e-book to alter a portion of content of electronic text at the suggested pause position for indicating the suggested pause position to the reader. For example, the font style, size or the like of text at the pause position may be altered from that of surrounding font for indicating the position. The pause position manager of the e-book may control the display of the tablet computer 300 to display the graphic 302 at this position.

Also, referring to FIG. 3, the tablet computer 300 may display graphics and/or text for indicating other suggested pause positions within an e-book. In this example, the tablet computer 302 displays a window 304 including text and indicia for indicating suggested pause positions within the currently-displayed e-book. The user may interact with the user interface of the tablet computer 300 for displaying the window 304. The window 304 may include selectable criteria for displaying suggested pause positions. For example, the user may select one or more boxes 306, 308, 310, and 312 for selecting one or more sources for suggested pause positions. In this example, the user may suitably interact with the user interface for selecting box 306 to present pause positions recommended by an author of the e-book. In another example, the user may suitably interact with the user interface for selecting box 308 to present pause positions recommended by an editor of the e-book. In another example, the user may suitably interact with the user interface for selecting box 310 to present pause positions recommended by other readers. In another example, the user may suitably interact with the user interface for selecting box 312 to present pause positions determined by text analysis (e.g., semantic analysis). The suggested pause positions of the author, editor, and/or other readers may be stored in the e-book's metadata or at a remote server. In response to selection of one of the boxes within the window 304, the pause position manager may present the suggested pause positions that correspond to the selections. For example, the window 304 may display text indicating the page numbers of suggested pause positions. In this example, the window 304 includes text indicating that suggested pause positions for the selected boxes are at pages 218, 223, 226, 230, and 236. Further, for example, if a suggested pause position is on a currently displayed page, the pause position manager may display a graphic, such as the graphic 302, for indicating the suggested pause position.

In another example of presenting a suggested pause position, the pause position manager 118 may control a speaker of the user interface 110 to emit a sound for indicating the suggested pause position(s). Further, in this example, in response to determining that a current position of the reader within the e-book 116 is located at or near a suggested pause position, the pause position manager 118 may control the speaker to emit the sound for notifying the reader that he or she has reached the suggested pause position.

In another example of presenting a suggested pause position, the pause position manager 118 may control a vibratory device of the user interface 110 to vibrate the e-book 116 for indicating the suggested pause position(s). Further, in this example, in response to determining that a current position of the reader within the e-book 116 is located at or near a suggested pause position, the pause position manager 118 may control the vibratory device to vibrate the e-book 116 for notifying the reader that he or she has reached the suggested pause position. The vibratory device may include, for example, a suitably-configured flywheel motor or other suitable mechanism configured to vibrate the e-book 116 in response to control by the pause position manager 118.

Figure 4:
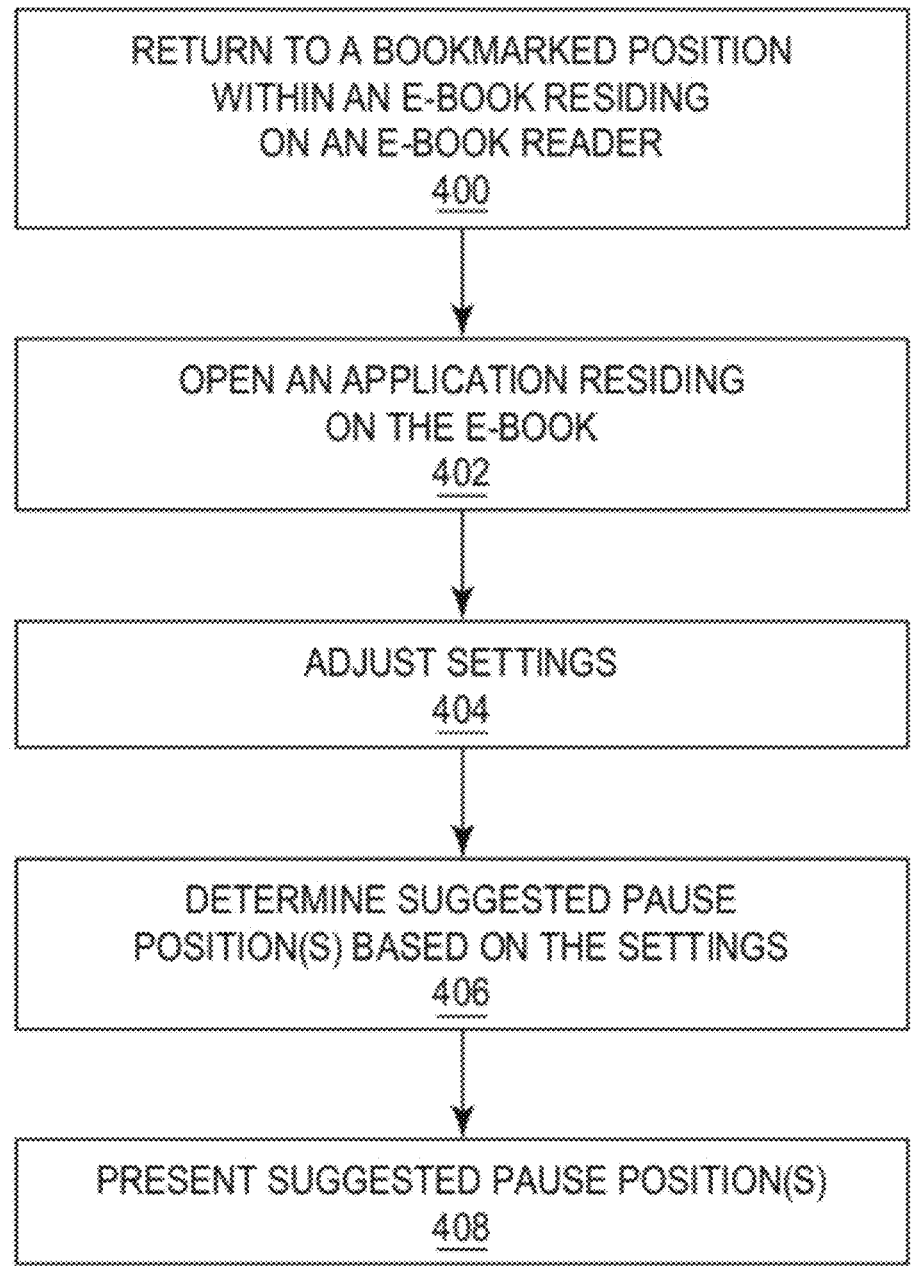
FIG. 4 is a flow chart of an exemplary method for suggesting a pause position within electronic text in accordance with embodiments of the present disclosure.

In accordance with embodiments of the present disclosure, FIG. 4 illustrates a flow chart of an exemplary method for suggesting a pause position within electronic text. The method of FIG. 4 is described with respect to system 100 shown in FIG. 1, although the method may be implemented by any suitable system or electronic device. The steps of FIG. 4 may be implemented entirely, or in part, by the pause position manager 118 residing on the e-book reader 102 shown in FIG. 1. The pause position manager 118 may be implemented by software, hardware, firmware, or combinations thereof.

Referring to FIG. 4, the method includes returning to a bookmarked position within an e-book residing on an e-book reader (step 400). For example, a reader of the e-book 116 may enter one or more input commands selecting the e-book 116 and for opening the e-book 116 at a bookmarked page.

The method of FIG. 4 includes opening an application residing on the e-book for presenting one or more suggested pause positions for the e-book (step 402). For example, a reader may interact with the user interface 110 of the e-book reader 102 for opening the application.

The method of FIG. 4 includes adjusting settings for determining and presenting one or more suggested pause positions (step 404). For example, the application may include a preferences feature for allowing the reader to adjust settings for determining and presenting the suggested pause position(s). In an example, the user may select to present suggested pause positions recommended by the author, the editor, the publisher, a reader community, the like, and combinations thereof. Further, suggested pause positions may be determined in accordance with the other examples provided herein. In an example, factors for determining suggested pause positions may include, for example, but are not limited to, spoiler avoidance, thematic continuity, scene continuity, and the like. Semantic analysis or other suitable analysis techniques may be used for applying such factors. In another example, the reader may select to present suggested pause positions based on information from crowd-sourced input from any suitable source such as, for example, but not limited to, an online bookstore where the e-book was purchased.

The method of FIG. 4 includes determining suggested pause position(s) based on the settings (step 406). For example, the pause position manager 118 may determine suggested pause positions based on metadata of the e-book 116 or data stored at the server 104 as described in the example set forth herein. The suggested pause positions may also be determined based on a current position with the e-book 116 as described in the examples presented herein. The pause position manager 118 may then present the suggested pause position(s) to the reader of the e-book (step 408).

In accordance with embodiments of the present disclosure, a reader may explicitly or implicitly enter his or her recommended pause positions for an e-book. For example, the reader may use the user interface 110 for explicitly entering one or more page numbers. In this example, the pause position manager 118 may receive the recommended pause positions and communicate a message to the server 104. Alternatively, the pause point manager 118 may automatically infer implicit recommended pause points from a user's reading behavior. As an example, if the user ends a reading session by ceasing reading for an extended period of time at a particular location in the e-book, that location may be assumed to be a candidate for pause point recommendation. In another example, a user may bookmark a location to resume reading at a later time. The bookmark location may also be a useful pause point recommendation. When detecting implicit pause points, the pause point manager 118 may also consider the structure and organization of the text to infer a more ideal pause point. For example, if the reader's implicit pause point is shortly after the end of a chapter or a paragraph, the pause point manager 118 may adjust the inferred recommended pause point to the location of the end of the chapter or paragraph. This may be based on the reasoning that the reader, without the benefit of foresight, may often continue reading past a chapter break, which may be a structure deliberately imposed on the text by the author or editor, only to discover later that the reader had passed the ideal pause point. As another example, if the reader's implicit pause point is located at a portion of text that is significantly dissimilar or unrelated to a portion of text preceding it, the inferred recommended pause point may be adjusted to the location at the end of the portion of the preceding text. This may be based on the reasoning that a reader, without the benefit of foresight, may need to read a portion of the content following a significant subject change, plot development or narrative shift before realizing it, and that the location at which the change occurs may be a more ideal pause point. These implicit pause point recommendations may thus be automatically communicated to the server 104 without requiring manual user input. The server 104 may collect the recommended pause positions along with other readers' recommended pause positions for use in suggesting pause positions to other readers of the e-book in accordance with embodiments of the presently disclosed subject matter. For example, statistical analysis of pause positions submitted to the server 104 may be used for determining one or more pause positions for other readers.

In accordance with embodiments of the present disclosure, a reader may specify a time constraint and/or focus control for a current reading session. For example, the user interface 110 of the e-book reader 102 may present to the user an interface with which the reader may interact for specifying a time constraint and focus control for a current reading session. For example, the reader may specify that he or she has 25 minutes available for this reading session. Further, for example, the reader may specify that his or her focus on reading is 90%. A high percentage of focus may mean that the reader does not expect to be disturbed at all or very little during the reading session. In an example, based on the time constraint and/or focus control information, the pause position manager 118 may determine how much content of an e-book from a current position that the reader can read in the current reading session. The pause position manager 118 may also use other factors, such as, but not limited to, an amount, type, and density of content between a current position and pause positions. Another example that may be applied for determining a suggested pause position includes a user profile of the reader (e.g., a reading speed of the reader for a given content density). The pause position manager 118 may then present the suggested pause position to the reader in accordance with embodiments of the present disclosure.

Figure 5:
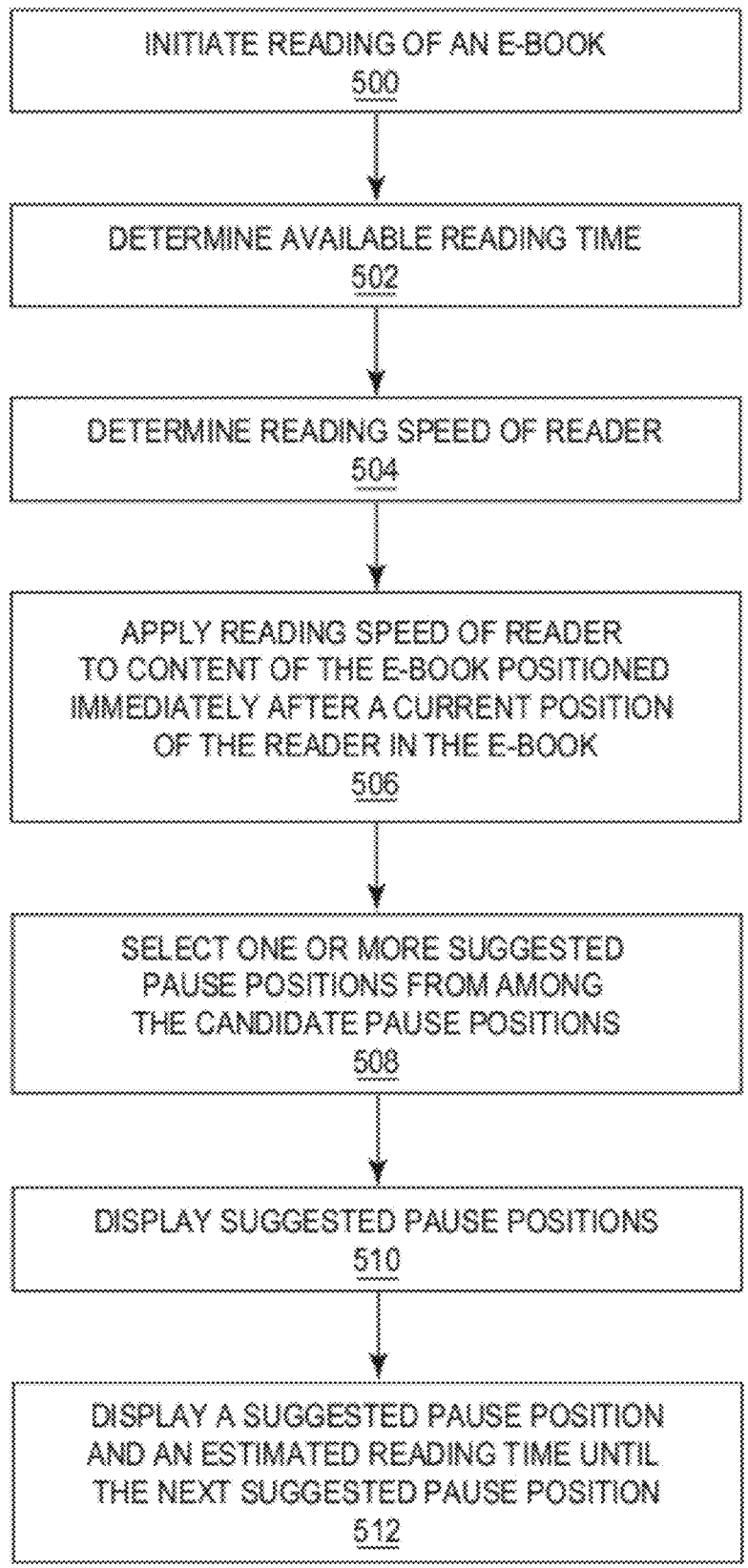
FIG. 5 is an exemplary method for providing suggested pause positions within an e-book in accordance with embodiments of the present disclosure.

FIG. 5 illustrates an exemplary method for providing suggested pause positions within an e-book in accordance with embodiments of the present disclosure. The method of FIG. 5 is described with respect to system 100 shown in FIG. 1, although the method may be implemented by any suitable system or electronic device. The steps of FIG. 5 may be implemented entirely, or in part, by the pause position manager 118 residing on the e-book reader 102 shown in FIG. 1. The pause position manager 118 may be implemented by software, hardware, firmware, or combinations thereof.

Referring to FIG. 5, the method includes initiating reading of an e-book (step 500). For example, a reader may interact with the user interface 110 of the e-book reader 102 to open the e-book 116.

The method of FIG. 5 includes determining an available reading time (step 502). For example, the pause position manager 118 may determine an available reading time based on a current time and sources such as, but not limited to, the reader's calendar, the reader's past reading history for a given time of day, manual reader input, the like, and combinations thereof.

The method of FIG. 5 includes determining a reading speed of the reader (step 504). For example, the pause position manager 118 may determine a current reading speed (e.g., an average speed) or a historical reading speed of the reader. The reading speed may be in the form of, for example, number of pages read per hour or number of words read per minute.

The method of FIG. 5 includes applying the reading speed of the reader to content of the e-book positioned immediately after a current position of the reader in the e-book for determining one or more candidate pause positions (step 506). For example, the pause position manager 118 may determine how much content the reader can cover after the current position based on the reading speed and an available reading time of the reader. Further, for example, the pause position manager 118 may determine how much content can be read based on the type of content of the entirety of the e-book, or only a portion of the e-book immediately following the current position. In this example, the pause position manager 118 may determine that the reader cannot read content having a higher difficulty level as efficiently as content having a lower difficulty level. In another example, the pause position manager 118 may apply other criteria for determining candidate pause positions such as, but not limited to, determining whether the content immediately following the current position includes a major plot development, includes the start of a new topic, and the like.

The method of FIG. 5 includes selecting one or more suggested pause positions from among the candidate pause positions (step 508). For example, the pause position manager 118 may merge, rank, and/or filter candidate pause positions for generating a list of suggested pause positions. More particularly, for example, the pause position manager 118 may determine that the reader can read about 25 pages from a current position within an available reading time and based on an average reading speed of the reader. In this example, the suggested pause positions may be filtered from the candidate pause positions to include only those pause positions located within the 25 pages following the reader's current position. Further, for example, the pause position manager 118 may merge pause positions from various sources such as, for example, but not limited to, metadata of the e-book and a remote server. In another example, the pause position manager 118 may rank pause positions based on, for example, but not limited to, how close the pause position is located to the position where the reader can be expected to reach within the available reading time. Further, in this example, the pause positions located closest to where the reader can be expected to reach can be given a higher ranking than the pause positions located further away.

The method of FIG. 5 includes displaying suggested pause positions (step 510). For example, the pause position manager 118 may control the display of the user interface 110 to display a list of the suggested pause positions. In this example, the pause positions may be listed in accordance with their ranking. In another example, the pause position manager 118 may control the display of the user interface 110 to display graphics or icons at the locations of the pause positions within the e-book for indicating the pause positions to the reader.

The method of FIG. 5 includes displaying a suggested pause position and an estimated reading time until the next suggested pause position (step 512). For example, as a current position of the reader within an e-book approaches a suggested pause position, the pause position manager 118 may control the display to highlight the suggested pause position and indicate the estimated reading time until the reader reaches the next suggested pause position. For example, the pause position manager 118 may determine the reading time until the reader reaches the next suggested pause position based on a current reading speed of the reader and content (e.g., difficulty level of the content) between the current position and the next suggested pause position.

Figure 6:
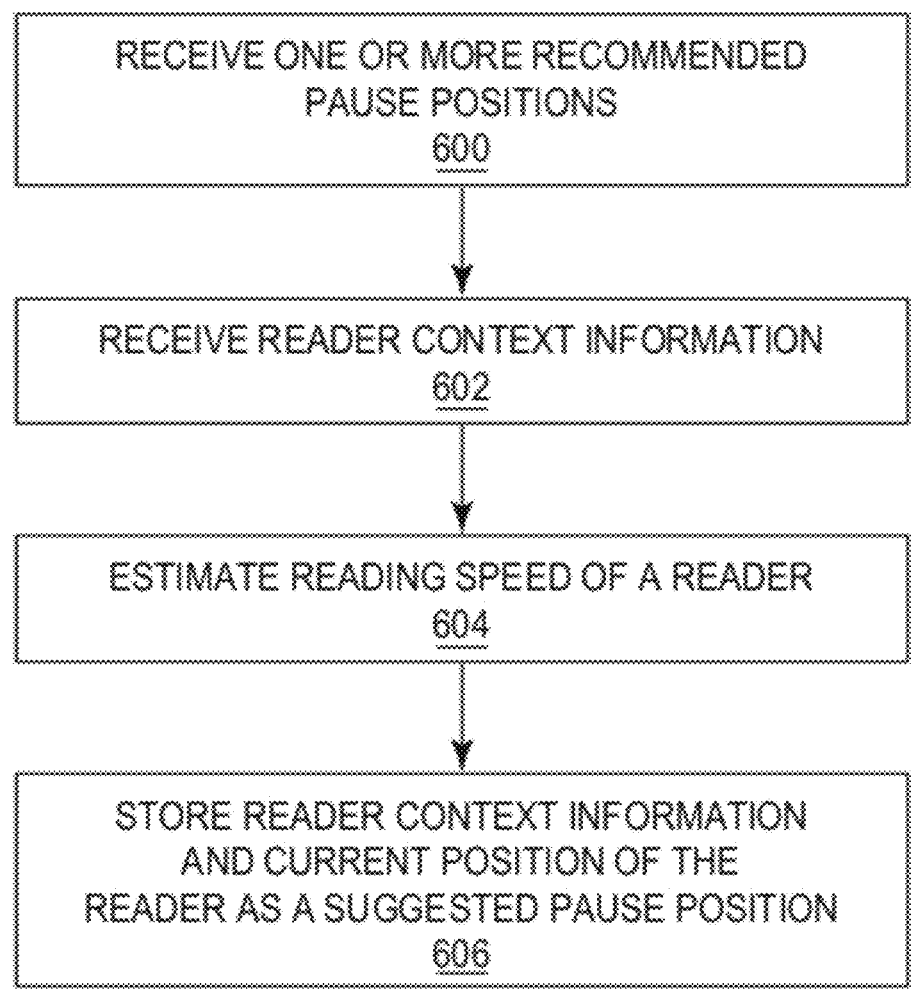
FIG. 6 is an exemplary method for determining a suggested pause position in accordance with embodiments of the present disclosure.

FIG. 6 illustrates an exemplary method for determining a suggested pause position in accordance with embodiments of the present disclosure. The method of FIG. 6 is described with respect to system 100 shown in FIG. 1, although the method may be implemented by any suitable system or electronic device. The steps of FIG. 6 may be implemented entirely, or in part, by the server 104 shown in FIG. 1. For example, the steps may be implemented by the processor 115 and a data store 120 of the server 104.

Referring to FIG. 6, the method includes receiving one or more recommended pause positions from an electronic device (step 600). For example, a user of the e-book reader 102 may interact with the user interface 110 for specifying a recommended pause position. In this example, the pause position manager 118 may receive the specified pause position for the e-book 116 and may, in response to receipt of the specified pause position, communicate to the server 104 a message identifying the e-book 116 and indicating the suggested pause position. In another example, the pause position manager 118 may automatically determine a suggested pause position based on an action by a reader. In this example, the pause position manager 118 may determine that a reader has closed the e-book 116 and may determine that the position where the e-book 116 was closed is a suggested pause position. Such information may be received by the server 104 and stored in a pause position store 122.

The method of FIG. 6 includes receiving reader context information (step 602). For example, the server 104 may receive reader context information such as, but not limited to, starting and current positions of a reader within an e-book, an estimated reading time (e.g., a difference between a start and stop time of a reader), a reading speed of a reader, time of day the reader has read, and the like. The reader context information may be received from an electronic device, such as the e-book reader 102.

The method of FIG. 6 includes estimating a reading speed of a reader (step 604). For example, the server 104 may estimate a reading speed of a reader of the e-book 116. The server 104 may estimate the reading speed based on one or a combination of the reader's starting position and current position in an e-book, content density of the e-book, content type of content positioned subsequent from the current position, and an available reading time.

The method of FIG. 6 includes storing the reader context information and a current position of the reader as a suggested pause position (step 606). For example, the server 104 can store the reader context information and current position in the pause position store 122. The information may be indexed using the current position and information about the reader's context. Such stored information may be used for providing suggested pause positions to other readers in accordance with embodiments of the present disclosure.

Figure 7:
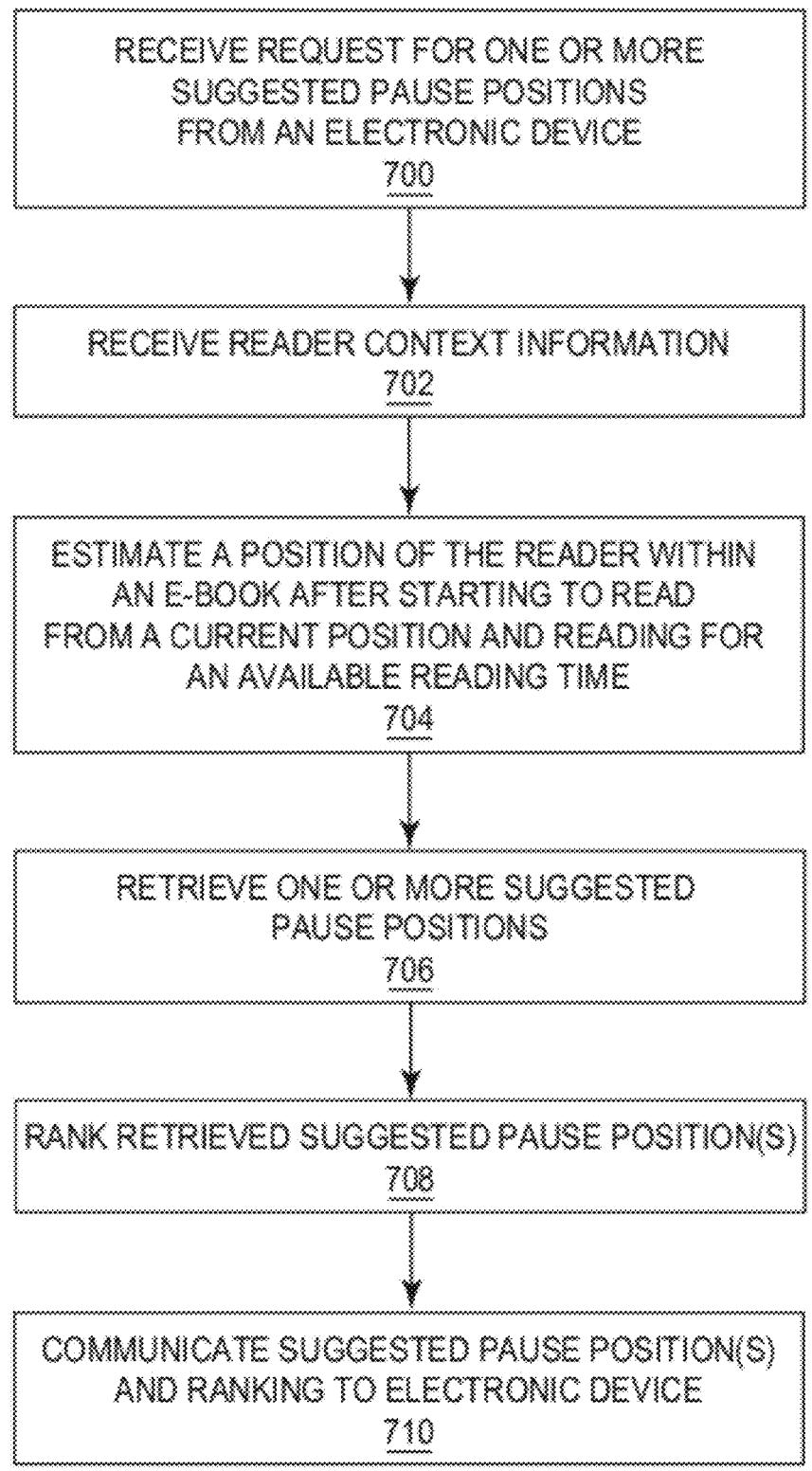
FIG. 7 is an exemplary method for providing a suggested pause position to an electronic device in accordance with embodiments of the present disclosure.

FIG. 7 illustrates an exemplary method for providing a suggested pause position to an electronic device in accordance with embodiments of the present disclosure. The method of FIG. 7 is described with respect to system 100 shown in FIG. 1, although the method may be implemented by any suitable system or electronic device. The steps of FIG. 7 may be implemented entirely, or in part, by the server 104 shown in FIG. 1. For example, the steps may be implemented by the processor 115 and the data store 120 of the server 104.

Referring to FIG. 7, the method includes receiving a request for one or more suggested pause positions from an electronic device (step 700). For example, the server 104 may receive a request from the e-book reader 102 via the Internet 114 for suggested pause positions within the e-book 116.

The method of FIG. 7 includes receiving reader context information from the electronic device (step 702). For example, the server 104 may receive from the e-book reader 102 context information such as, but not limited to, a current position of the reader within the e-book 116, an estimated available reading time, a reading speed of the reader, the like, and combinations thereof.

The method of FIG. 7 includes estimating a position of the reader within an e-book after starting to read from a current position and reading for an available reading time (step 704). For example, the server 104 may estimate the position based on, but not limited to, a content density following the current position, a content type following the current position, and a reading speed of the reader.

The method of FIG. 7 includes retrieving one or more suggested pause positions (step 706). For example, the server 104 may retrieve from the pause position store 122 one or more suggested pause positions for the e-book 116. The suggested pause positions may be retrieved based on an estimated position of the reader within the e-book 116 and an available reading time for the reader.

The method of FIG. 7 includes ranking the retrieved suggested pause position(s) (step 708). For example, the server 104 may rank retrieved suggested pause positions based on a number of readers who have recommended the same or a proximal pause position, a source of the recommendation (e.g., an author, editor, another reader, another reader in the reader's social network, and the like), a similarity of a user profile of the reader to a recommender's reading profile, a similarity of the recommender's context (e.g., time of day at which the pause point was recommended) to the reader, the like, and combinations thereof.

The method of FIG. 7 includes communicating the suggested pause position(s) and ranking to the electronic device (step 710). For example, the server 104 may generate a message including suggested pause positions and their rankings and may communicate the message to the e-book reader 102. The message may be communicated to the e-book reader 102 by the network interface 117 via the Internet 114.

Figure 8:
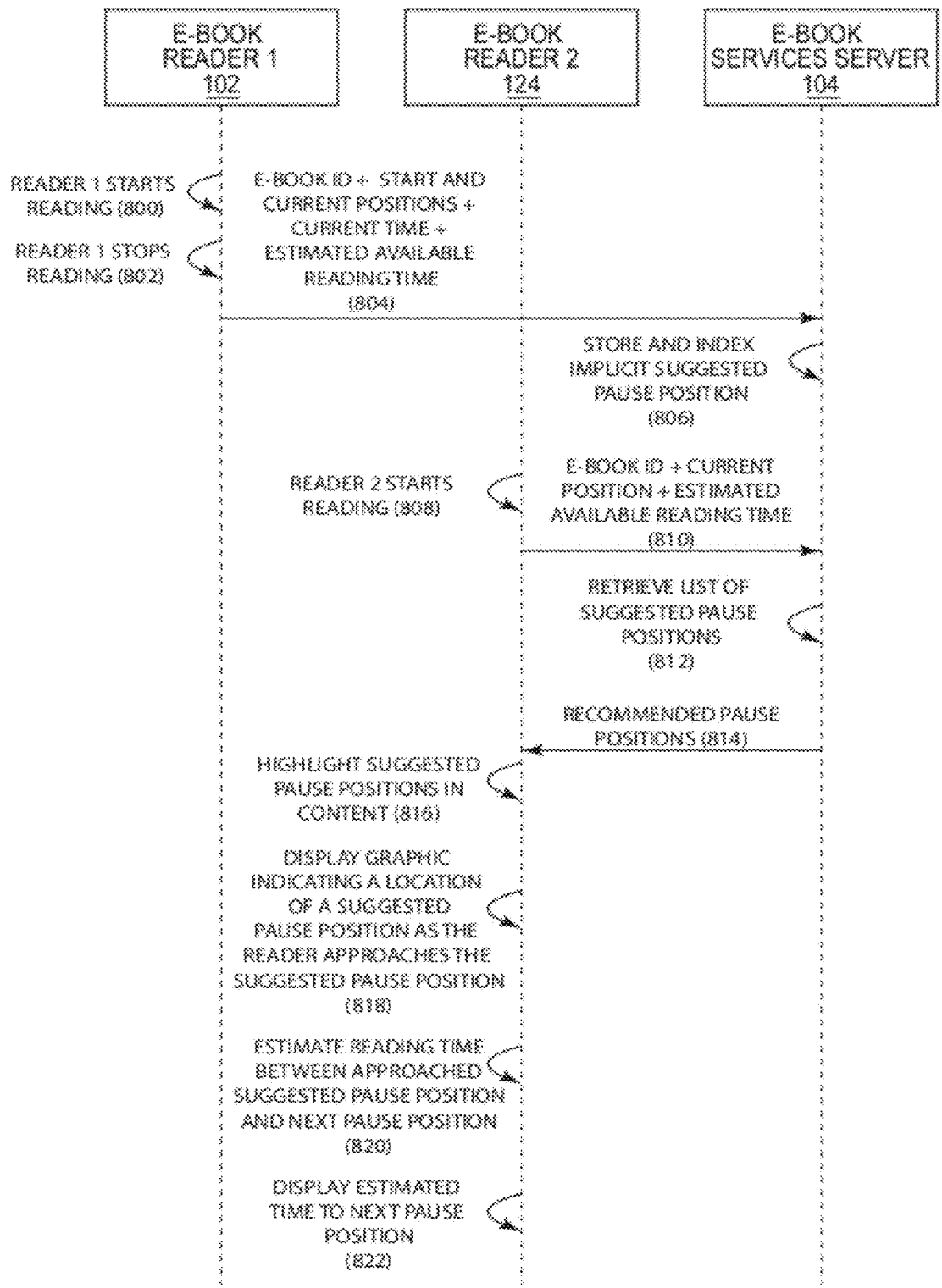
FIG. 8 is a message flow diagram of an exemplary operation of the system shown in FIG. 1 in accordance with embodiments of the present disclosure.

FIG. 8 illustrates a message flow diagram of an exemplary operation of the system 100 shown in FIG. 1 in accordance with embodiments of the present disclosure. Referring to FIG. 8, a reader using the e-book reader 102 may start reading the e-book 116 (step 800). At step 802, the reader may stop reading the e-book 116.

At step 804, the e-book reader 102 may generate a message containing an e-book identifier for the e-book 116, a start position (i.e., the position within the e-book 116 at step 800), a current position within the e-book 116, and an estimated reading time from step 800 to step 802. The e-book reader 102 may communicate the message to the server 104. At step 806, the server 104 may store and index an implicit suggested pause position. For example, the server 104 may store and index the current position as a suggested pause position along with context information received from the e-book reader 102.

At step 808, a reader of an e-book reader 124 may start reading an e-book that is the same as the e-book 116. It is noted that the e-book reader 124 may include the same functionality and components of the e-book reader 102; however, these components are not shown for convenience. In response to the reader starting to read the e-book at the e-book reader 124, a pause position manager of the e-book reader 124 may generate a message containing an e-book identifier for the e-book, a current position, and an estimated available reading time. At step 810, the e-book reader 124 may communicate the message to the server 104.

At step 812, the server 104 may retrieve a list of suggested pause positions. For example, the server 104 may retrieve from the pause position store 122 a list of suggested pause positions based on the current position, e-book identifier, and available reading time of the reader of e-book reader 124. Next, at step 814, the server 104 may communicate the message to the e-book reader 124.

At step 816, the e-book reader 124 may receive the message from the server 104 and may highlight suggested pause positions in response to receipt of the message. For example, the e-book reader 124 may display graphics within the text of the displayed e-book for indicating suggested pause positions.

At step 818, the e-book reader 124 may display a graphic indicating a location of a suggested pause position as the reader approaches the suggested pause position while reading the e-book. For example, the reader may interact with the user interface of the e-book reader 124 for displaying content of the e-book located at or near the suggested pause position. In this example, the e-book reader 124 may display a graphic indicating the location of the suggested pause position in accordance with embodiments of the present disclosure.

At step 820, the e-book reader 124 estimates a reading time between the approached suggested pause position and the next suggested pause position. The e-book reader 124 may then display or otherwise present to the reader the estimated time needed for the reader to reach the next suggested pause position (step 822). For example, the e-book reader 124 may display a window including text indicating the estimated time.

Figure 9:
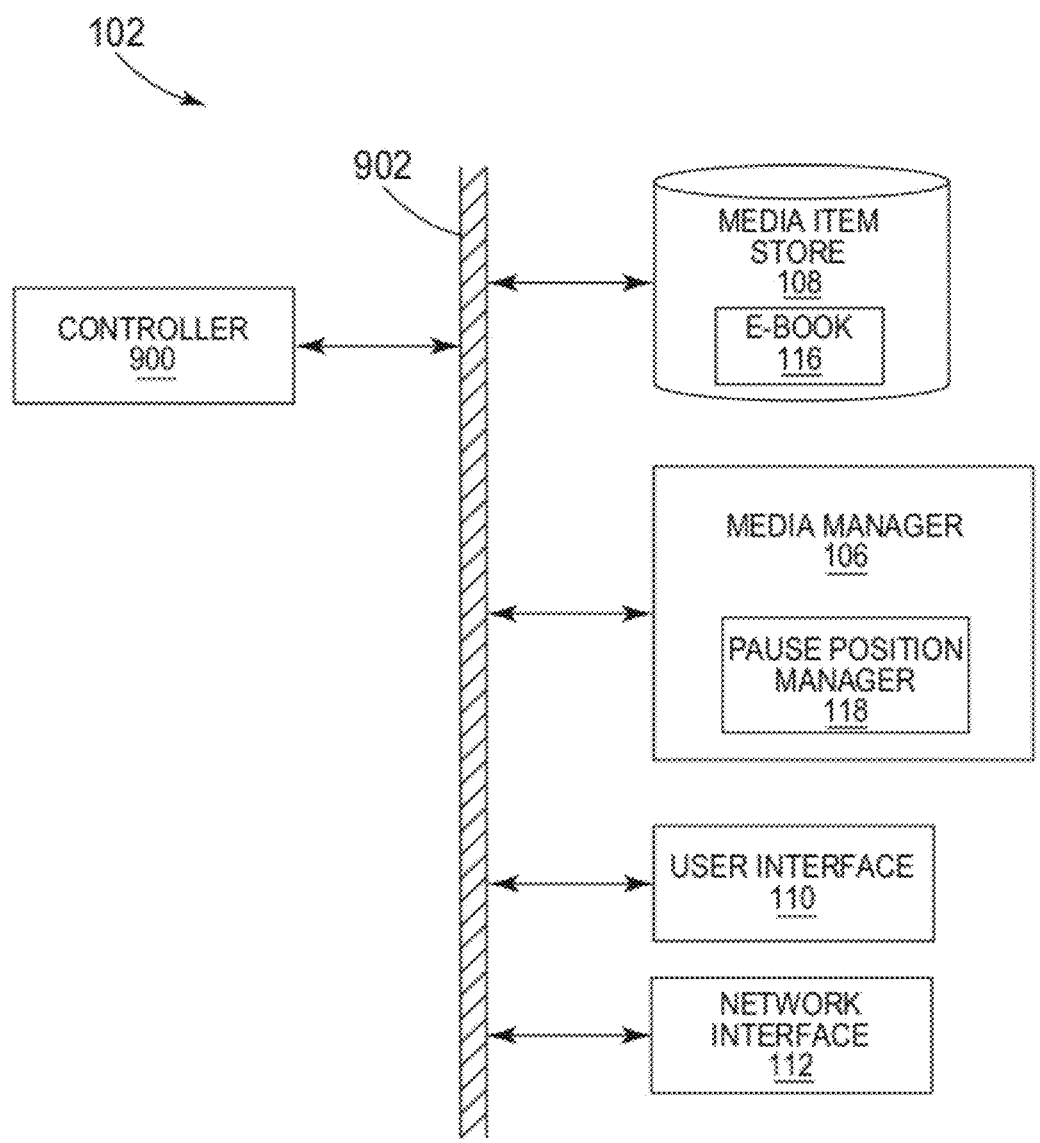
FIG. 9 is a block diagram of the e-book reader shown in FIG. 1 according to embodiments of the present disclosure.

FIG. 9 is a block diagram of the e-book reader 102 shown in FIG. 1 according to embodiments of the present disclosure. Alternatively, the block diagram may depict the e-book reader 124 shown in FIG. 1 or any other suitable electronic device. Referring to FIG. 9, the e-book reader 102 may include a controller 900 connected to the media item store 108, the media manager 106 including the pause position manager 118, the user interface 110, and the network interface 112 by a bus 902 or similar mechanism. The media item store 108 may store the e-book 116. The controller 900 may be a microprocessor, digital ASIC, FPGA, or the like. In this example, the controller 900 is a microprocessor, and the media manager 106 and the pause position manager 118 are implemented in software and may be stored in a suitable memory or data store. The network interface 112 may be a local wireless interface such as a wireless interface operating according to one of the suite of IEEE 802.11 standards, a mobile communications interface, or the like. The user interface 110 may include, for example, a touchscreen, a display, one or more user input components (e.g., a keypad), a speaker, or the like, or any combination thereof.

Figure 10:
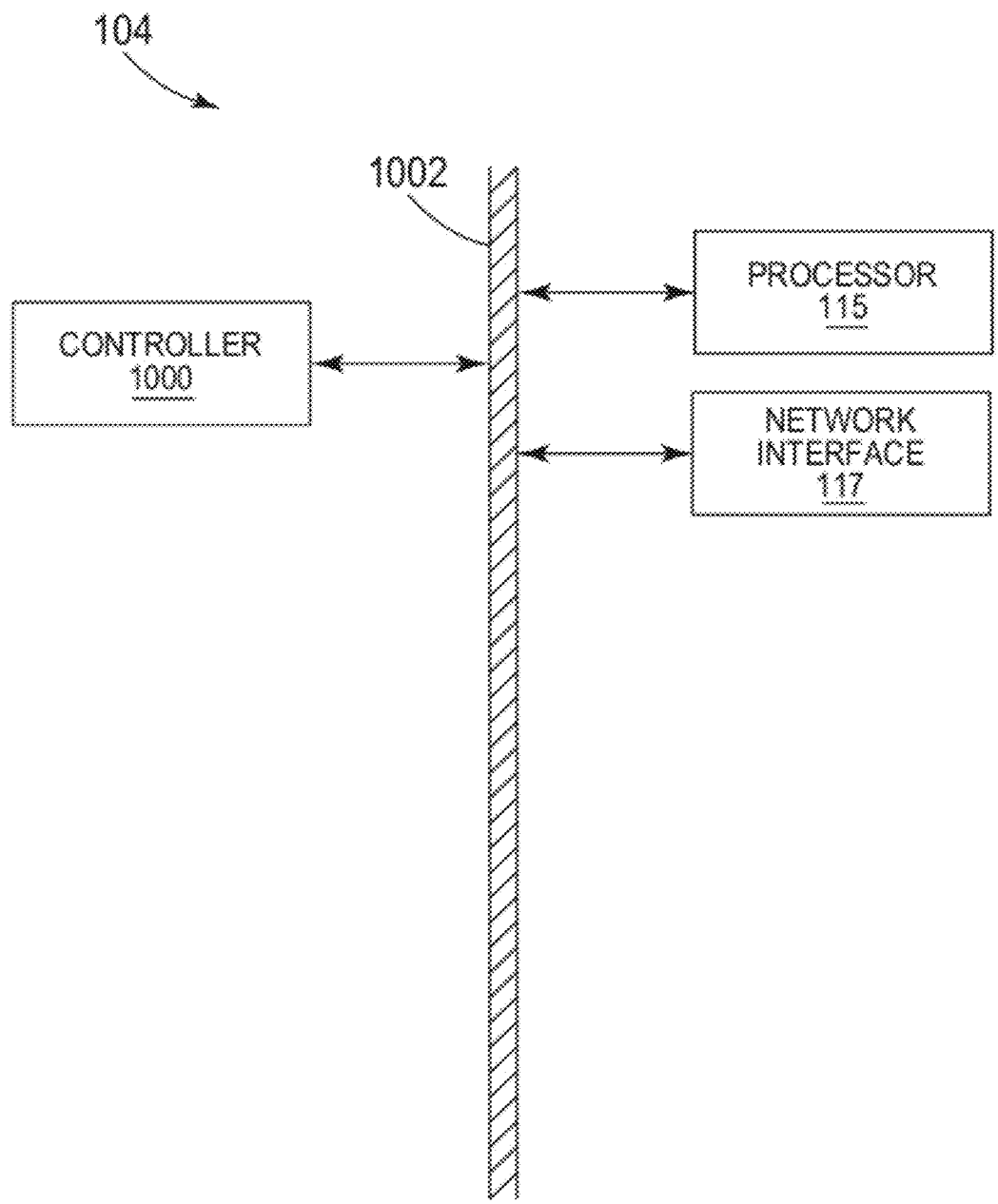
FIG. 10 is a block diagram of the server shown in FIG. 1 according to embodiments of the present disclosure.

FIG. 10 is a block diagram of the server 104 shown in FIG. 1 according to embodiments of the present disclosure. Referring to FIG. 10, the server 104 may include a controller 1000 connected to the processor 115 and the network interface 117 by a bus 1002 or similar mechanism. The controller 1000 may be implemented as software suitably stored in memory and executable by the processor 115. The controller 1000 may be configured to implement one or more functions described herein. The processor 115 may be a microprocessor, digital ASIC, FPGA, or the like. In this example, the processor 115 is a microprocessor. The network interface 117 may be a local wireless interface such as a wireless interface operating according to one of the suite of IEEE 802.11 standards, a mobile communications interface, or the like.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system.

However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
    receiving identification of a current user reading position within an electronic text of an electronic book residing on an electronic book reading device for a current reading session;
    determining candidate pause positions within the electronic text of the electronic book based on the current user reading position and from among a portion of the electronic text extending from the current user reading position and another reading position following the current user reading position within the electronic text of the electronic book;
    selecting a suggested pause position from the determined candidate pause positions based on an available reading time and reading speed associated with a user profile of the current user for the current reading session; and
    presenting the suggested pause position on a user interface of the electronic device to indicate where to pause in reading the electronic text of the electronic book for the current reading session.

2. The method of claim 1, wherein receiving identification of the current user reading position comprises determining that the electronic device is presenting on the user interface a portion of the electronic text of the electronic book that corresponds to the current user reading position.

3. The method of claim 1, wherein the electronic text of the electronic book comprises metadata including the candidate pause positions, and
    wherein determining the candidate pause positions comprises extracting the candidate pause positions from the metadata of the electronic text of the electronic book.

4. The method of claim 1, further comprising receiving the candidate pause positions from a server via a communications network.

5. The method of claim 1, wherein determining the candidate pause positions comprises determining the candidate pause positions based on reading behavior of a plurality of other readers.

6. The method of claim 5, wherein the reading behavior is reading behavior of other readers reading the electronic text of the electronic book.

7. The method of claim 1, wherein determining the candidate pause positions comprises determining the candidate pause positions based on actual pause positions of other readers who have read the electronic text of the electronic book.

8. The method of claim 1, wherein selecting the suggested pause position comprises selecting the suggested pause position based on the user profile.

9. The method of claim 8, wherein the user profile comprises at least one of an available read time for a user, a calendar of the user, a reading behavior of the user, a current time, a reading speed of the user, an activity of the user; and a time constraint for the current reading session.

10. The method of claim 1, wherein determining the candidate pause positions comprises determining the candidate pause positions based on a content of the electronic text of the electronic book.

11. The method of claim 10, wherein determining the candidate pause positions comprises applying semantic analysis to the content of the electronic text of the electronic book.

12. The method of claim 11, wherein applying semantic analysis comprises:
    determining a portion of the content of the electronic text of the electronic book relating to at least one of a plot point and subject change; and
    assigning a position of the determined portion of the content as a candidate pause position of the candidate pause positions.

13. The method of claim 11, wherein applying semantic analysis comprises:
    determining a similarity score between text subgroups within the electronic text of the electronic book;
    determining whether the similarity score is less than a predetermined threshold; and
    in response to determining that the similarity score is less than the predetermined threshold, assigning a position between the text subgroups as a candidate pause position of the candidate pause positions.

14. The method of claim 1, wherein presenting the suggested pause position comprises controlling a display of the electronic book reading device to display a graphic corresponding to the suggested pause position.

15. The method of claim 1, further comprising determining that the current user reading position is the suggested pause position,
    wherein presenting the suggested pause position comprises controlling a speaker of the electronic book reading device to emit a sound in response to determining that the current user reading position is the suggested pause position.

16. The method of claim 1, further comprising altering a portion of content of the electronic text of the electronic book at the suggested pause position,
    wherein presenting the suggested pause position comprises controlling a display of the electronic book reading device to display the altered portion of content.

17. An electronic book reading device comprising:
    a pause position manager configured to:
        receive identification of a current user reading position within an electronic text of an electronic book for a current reading session; and
        determine candidate pause positions within the electronic text of the electronic book based on the current user reading position and from among a portion of the electronic text extending from the current user reading position and another reading position following the current user reading position;

select a suggested pause position from the determined candidate pause positions based on an available reading time and reading speed associated with a user profile of the current user for the current reading session; and a user interface configured to present the suggested pause position to indicate where to pause in reading the electronic text of the electronic book for the current reading session.

18. The electronic device of claim 17, wherein the pause position manager is configured to determine that the electronic book reading device is presenting a portion of the electronic text of the electronic book that corresponds to the current user reading position.

19. The electronic device of claim 17, wherein the electronic text of the electronic book comprises metadata including the candidate pause positions, and wherein the pause position manager is configured to extract the candidate pause positions from the metadata of the electronic text of the electronic book.

20. The electronic device of claim 17, further comprising a network interface configured to receive the candidate pause positions from a server via a communications network.

21. The electronic device of claim 17, wherein the pause position manager is configured to determine the candidate pause positions based on reading behavior of a plurality of other readers.

22. The electronic device of claim 21, wherein the reading behavior is reading behavior of other readers reading the electronic text of the electronic book.

23. The electronic device of claim 17, wherein the pause position manager is configured to determine the candidate pause positions based on actual pause positions of other readers who have read the electronic text of the electronic book.

24. The electronic device of claim 17, wherein the pause position manager is configured to select the suggested pause position based on the user profile.

25. The electronic device of claim 24, wherein the user profile comprises at least one of an available read time for the user, a calendar of a user, a reading behavior of the user, a current time, a reading speed of the user, an activity of the user; and a time constraint for the current reading session.

26. The electronic device of claim 17, wherein the pause position manager is configured to determine the candidate pause positions based on a content of the electronic text of the electronic book.

27. The electronic device of claim 26, wherein the pause position manager is configured to apply semantic analysis to the content of the electronic text of the electronic book.

28. The electronic device of claim 27, wherein the pause position manager is configured to:

determine a portion of the content of the electronic text of the electronic book relating to at least one of a plot point and subject change; and assign a position of the determined portion of the content as a candidate pause position of the candidate pause positions.

29. The electronic device of claim 27, wherein the pause position manager is configured to:

determine a similarity score between text subgroups within the electronic text of the electronic book;

determine whether the similarity score is less than a predetermined threshold; and in response to determining that the similarity score is less than the predetermined threshold, assign a position between the text subgroups as a candidate pause position of the candidate pause positions.

30. The electronic device of claim 17, wherein the user interface includes a display configured to display a graphic corresponding to the suggested pause position for indicating the suggested pause position.

31. The electronic device of claim 17, wherein the pause position manager is configured to:

determine that the current user reading position is the suggested pause position; and control a speaker of the user interface to emit a sound in response to determining that the current user reading position is the suggested pause position.

32. The electronic device of claim 17, wherein the pause position manager is configured to alter a portion of content of the electronic text of the electronic book at the suggested pause position, wherein the pause position manager is configured to control a display of the user interface to display the altered portion of content.

33. A non-transitory computer-readable storage medium having stored thereon computer executable instructions for performing the following steps:

receiving identification of a current user reading position within an electronic text of an electronic book residing on an electronic book reading device for a current reading session;

determining candidate pause positions within the electronic text of the electronic book based on the current user reading position and from among a portion of the electronic text extending from the current user reading position and another reading position following the current user reading position within the electronic text of the electronic book;

selecting a suggested pause position from the determined candidate pause positions based on an available reading time and reading speed associated with a user profile of the current user for the current reading session; and presenting the suggested pause position on a user interface of the electronic device to indicate where to pause in reading the electronic text of the electronic book for the current reading session.

* * * * *